United States Patent [19]

Ounadjela

[11] Patent Number: 5,477,101
[45] Date of Patent: Dec. 19, 1995

[54] DOWNHOLE ACOUSTIC TRANSDUCER

[75] Inventor: Abderrhamane Ounadjela, Paris, France

[73] Assignee: Schlumberger Technology Corporation, Houston, Tex.

[21] Appl. No.: 286,598

[22] Filed: Aug. 5, 1994

Related U.S. Application Data

[63] Continuation of Ser. No. 79,693, Jun. 17, 1993, abandoned, which is a continuation of Ser. No. 782,015, Oct. 24, 1991.

[30]     Foreign Application Priority Data

Nov. 6, 1990 [FR] France ................................. 90 13695

[51] Int. Cl.⁶ ................................................... H01L 41/08
[52] U.S. Cl. ........................ 310/334; 310/328; 310/367; 367/159
[58] Field of Search ................................. 310/328, 334, 310/367; 367/159, 166, 167

[56]         References Cited

U.S. PATENT DOCUMENTS

| 3,461,910 | 8/1969 | Selsam et al. ........................... 310/337 |
| 4,151,437 | 4/1979 | Tocquet ................................... 310/337 |
| 4,462,093 | 7/1984 | Upton ...................................... 367/165 |
| 4,525,645 | 6/1985 | Shirley et al. ........................... 310/337 |
| 4,651,044 | 3/1987 | Kompanek ............................... 310/334 |
| 4,788,467 | 11/1988 | Plambeck ............................... 310/334 |
| 4,922,470 | 5/1990 | McMahon et al. ..................... 310/337 |
| 5,043,952 | 8/1991 | Hoyle et al. ............................ 310/334 |
| 5,103,130 | 4/1992 | Rolt et al. ............................... 310/337 |

FOREIGN PATENT DOCUMENTS

| 0243591 | 11/1987 | European Pat. Off. .......... H04R 1/44 |
| 1397142 | 3/1965 | France . |
| 2158580 | 11/1985 | United Kingdom ........... G01V 1/143 |

*Primary Examiner*—Thomas M. Dougherty
*Attorney, Agent, or Firm*—Henry N. Garrana; John H. Bouchard

[57]               ABSTRACT

An acoustic transducer comprises two pairs of opposite elongate segments (20) placed inside a deformable tube (14). Drive means (22) operable to expand in a direction orthogonal to the axis of the tube are disposed between the segments of each pair. The drive means occupy a substantial portion of the inside volume of the tube. A preferred arrangement includes drive means for a pair of segments longitudinally displaced from the drive means for the other pair. Drive means may be constituted by stacks of piezoelectric pellets (24) extending radially relative to the axis of the tube. A pressure compensation system is provided to keep the pressure inside the tube (14) substantially equal to the external pressure. Longitudinal flutes (14a) are formed inside the tube (14) between the segments (20) to facilitate tube deformation and amplify volume variation.

13 Claims, 2 Drawing Sheets

DOWNHOLE ACOUSTIC TRANSDUCER

This is a continuation of application Ser. No. 07/782,015 FILED Oct. 24, 1991.

BACKGROUND OF THE INVENTION

1. Field Of The Invention

The invention relates to a downhole acoustic transducer for use in a well such as an oil well for the purpose of generating or detecting acoustic waves. Depending on circumstances, the transducer constitutes a seismic source or a receiver.

2. Description Of The Prior Art

Downhole seismic sources are used to determine underground geological characteristics in the region surrounding the well in which the source is placed. They are designed to create acoustic waves and to transmit these waves as fully as possible to the inside wall of the well. Receivers such as accelerometers, geophones, or hydrophones detect these acoustic waves after they have passed through the subsoil. After treatment, the measured waves serve to determine the characteristics of the underground formations passed through.

In a first measurement technique referred to as the "cross well seismic" technique, the receivers are placed in wells other than the well containing the source. In a second measurement technique referred to as the "single well seismic" technique, the receivers are placed in the same well as the source. .

Other configurations are also possible, and in particular the receivers may be placed on the surface of the ground while the transmitters are placed down the well.

U.S. Pat. No. 4,525,645 describes a piezoelectric seismic source constituted by piezoelectric rings that are polarized in a radial direction and glued to the inside of a metal tube which is closed at its ends. This source suffers from the drawback of not including a pressure balancing system for balancing the pressure between the inside of the tube and the external pressure. Consequently, it is necessary to increase the thickness of the metal tube to increase its mechanical strength for withstanding pressure. Given that any increase in this thickness also increases the stiffness of the tube, such an increase in wall thickness also reduces the change in volume of the source as generated by expansion of the piezoelectric rings when under voltage stimulation.

Another drawback of seismic sources of this type stems from the use of piezoelectric rings that are polarized radially. An improvement in acoustic performance can only be obtained by increasing the radial thickness of the piezoelectric rings which would require a proportional increase in the voltage applied to the rings. Given that the electrical voltage available at the bottom of a borehole is limited (e.g. to about 3000 volts), this leads in practice to a limitation on the acoustic performance of the source. Given these various limitations due to its design, it is practically impossible to make a seismic source of the type described in U.S. Pat. No. 4,525,645 capable of withstanding pressure greater than about 400 bars, while still having acceptable acoustic performance.

Because of the limited power of such a source, it is generally excited at its resonant frequency which is about 1 kHz under operating conditions. However, operating at its resonant frequency gives rise to seismic waves of relatively long duration. The signals delivered by the receivers therefore require complex processing in order to separate successive seismic events in time.

U.S. Pat. No. 4,651,044 proposes a second piezoelectric seismic source, derived from the preceding source. In the second source, the piezoelectric rings and the tube in which they are glued are open over their entire length parallel to their axis, and the assembly is placed inside an external sealing sheet. In a variant, the piezoelectric rings are replaced by a stack of piezoelectric pellets radially oriented relative to the tube so as to bear there against at locations situated at equal distances from the axially formed slot inside the tube.

However, in this case also, there is no balancing between the pressure inside the source and the external pressure. Consequently, when the external pressure increases, the tube closes and the source behaves like the first source. In addition, having a slot along the tube rapidly makes it very difficult to maintain sealing with increasing external pressure. For the same reasons as in the source described in U.S. Pat. No. 4,525,645, the second piezoelectric source has limited acoustic performance. It too therefore requires to be operated at resonance, which leads to complex processing of the signals delivered by the receivers.

An object of the invention is to provide a high-performance acoustic transducer suitable for use as a borehole seismic source.

A further object is to provide a transducer capable of providing a high power while operating outside its resonant frequency, whereby subsequent processing of the detected signals is simplified.

A further object is to provide a transducer capable of withstanding high pressure and high temperature encountered in boreholes.

A preferred embodiment of the invention is described below by way of non-limiting example and with reference to the accompanying drawings, in which:

DETAILED DESCRIPTION OF THE INVENTION

Figure 1:
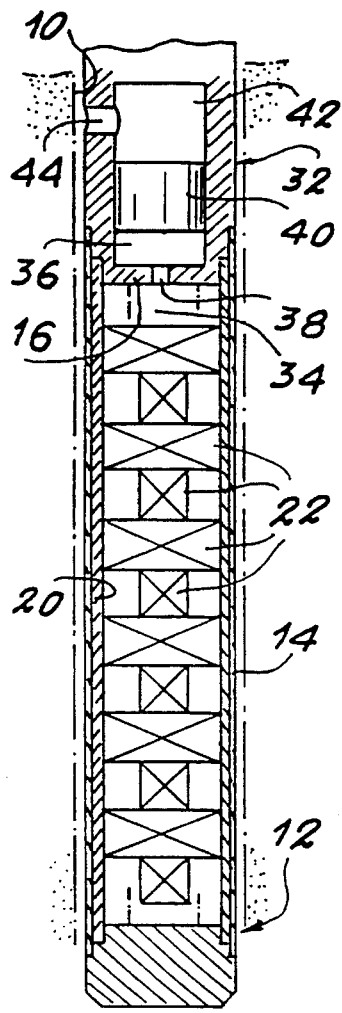
FIG. 1 is a highly diagrammatic longitudinal section through an acoustic transducer of the invention and placed in a borehole.

In FIG. 1, reference 10 designates an oil well traversing an underground formation which is to be investigated. To this end, an acoustic transducer is lowered down the well 10, the transducer being constituted in the example shown by a piezoelectric seismic source given an overall reference 12. Depending on the measurement technique being used, receivers (not shown) are placed either in other, adjacent wells (the cross-well seismic technique), or in the well 10 itself (the single well seismic technique), or else on the surface of the ground.

Whichever measurement technique is used, the seismic source 12 is actuated successively at different depths and the signals detected by the receivers are analyzed in order to determine the characteristics of the underground formations surrounding the well 10.

Figure 3:
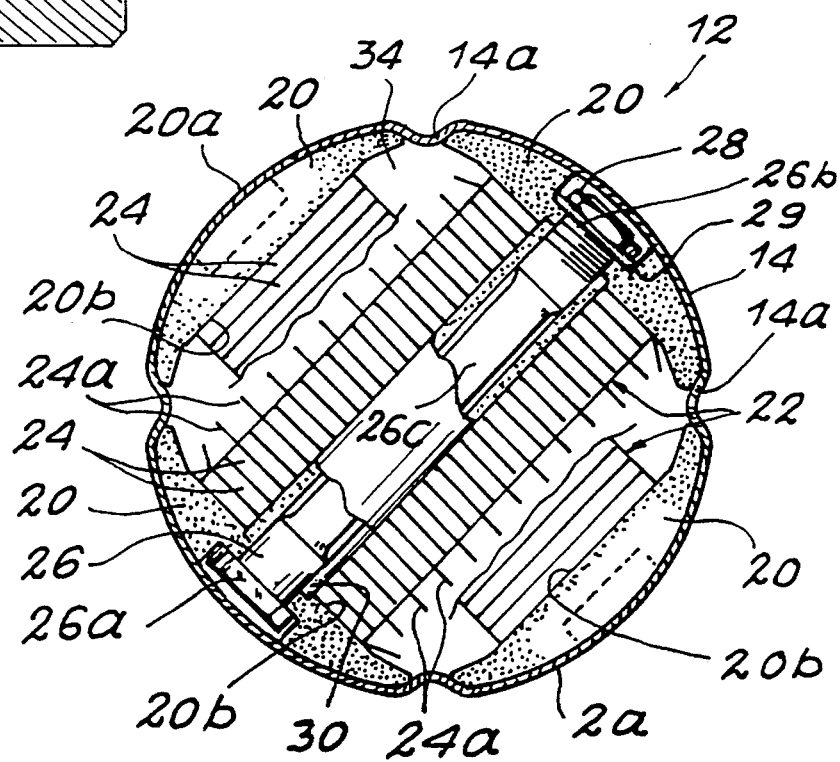
FIG. 3 is a cross-section through an acoustic transducer of the invention.
Figure 2:
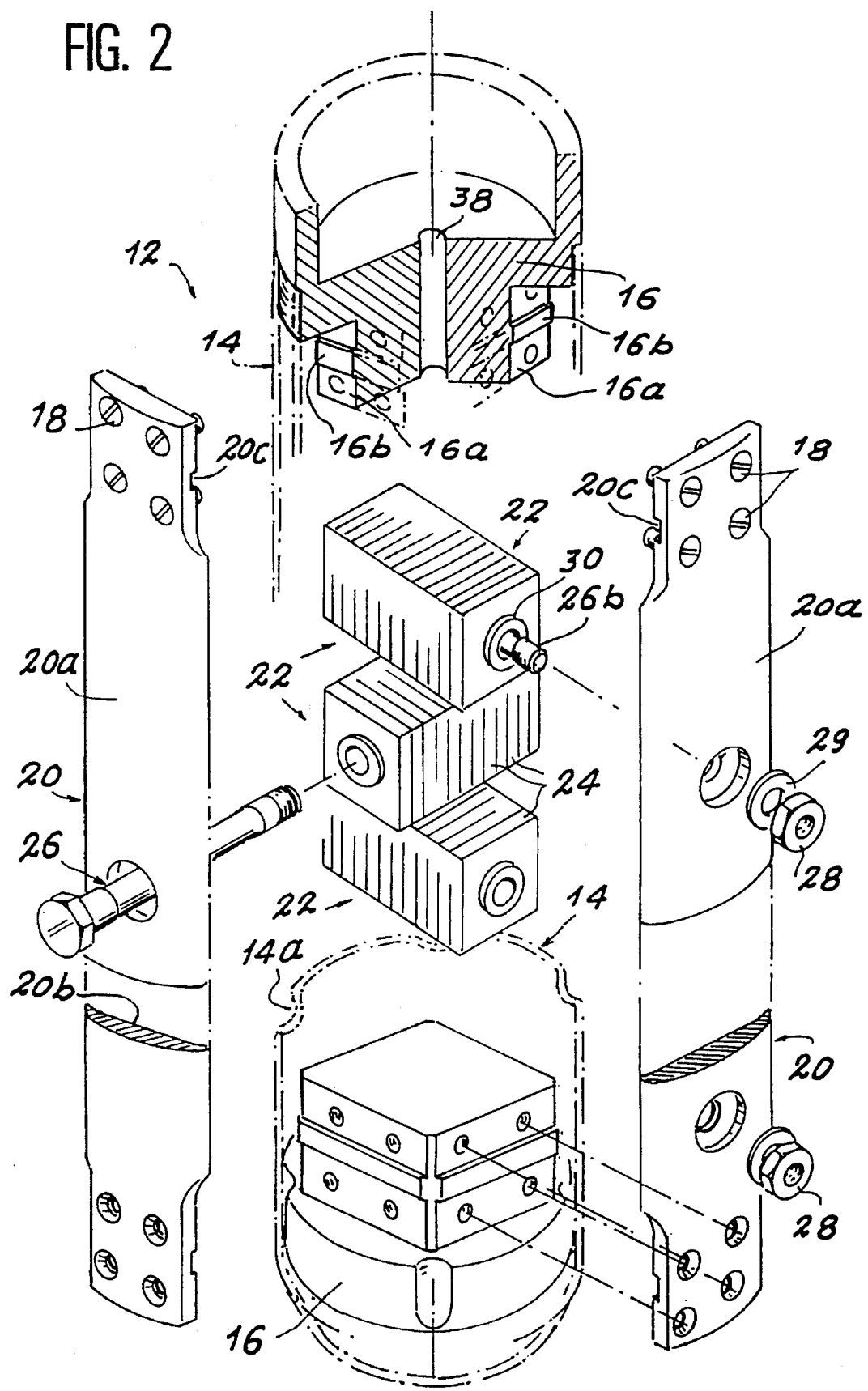
FIG. 2 is an exploded perspective view on a larger scale showing the acoustic transducer of FIG. 1.

As shown more clearly in FIGS. 2 and 3, the transducer 12 of the invention comprises a thin-walled deformable fluid-tight outer tube 14 made of steel or titanium, for example. The tube 14 which is generally in the form of a circular cylinder is closed at each of its ends by a rigid plug 16.

The outside diameter of the tube 14 (e.g. about 10 cm) is selected to be smaller than the inside diameter of the well 10 into which the transducer is to be inserted. The axis of the transducer as defined by the axis of the tube 14 then lies parallel to the axis of the well.

Four longitudinal segments 20 are placed inside the cylindrical tube 14 so that the outside surfaces 20a of the segments (complementary to the inside surface of the tube) are in close contact with the inside surface of the tube. The outside surface 20a of each segment 20 consequently occupies an arc of a circle subtending an angle of slightly less than 90° in section on a plane extending radially relative to the axis of the tube 14. In addition, the four segments 20 present a common cylindrical outside envelope.

The segments 20 extend over the major portion of the height of the tube 14 between the rigid plugs 16. Their ends are fixed, e.g. by means of screws 18, to flats 16a formed on the plugs 16. The plugs 16 are axially positioned relative to the segments 20 by projecting portions 16b formed perpendicularly to the axis of the tube 14 on the flats 16a, and penetrating into grooves 20c formed in the segments.

As can be seen in particular in FIG. 3, the segments 20 form two pairs of segments, with the segments of each pair being disposed at diametrically opposite locations inside the tube 14 and presenting facing inside surfaces 20b which are plane and parallel, and against which the drive members 22 bear.

In the embodiment shown, each of the drive members 22 comprises a stack of ceramic piezoelectric pellets 24 which are all identical and mounted around a prestress rod 26 interconnecting the two segments 20 of the same pair along a direction perpendicular to the inside surfaces 20b of said segments and extending radially relative to the axis of the source.

More precisely, each of the rods 26 passes through aligned holes formed in the two segments 20 and through each of the pellets 24 of the stack 22. The rod 26 has a head 26a received in an enlarged external portion of the hole through one of the segments 20. At its opposite end, the rod 26 is terminated by a thread 26b on which a nut 28 is tightened, with the nut being received in an enlarged external portion of the hole passing through the other segment 20. A washer 29 is interposed between the nut 28 and said other segment 20. Between its head 26a and its thread 26b, the rod 26 includes a calibrated intermediate portion 26c. During assembly, the tightening of the nut 28 is monitored so as to apply predetermined prestress to the stack of piezoelectric pellets 24 received on the rod 26 between the corresponding segments 20. A sleeve 30 of electrically insulating material is placed over the rod 26 in order to ensure that the piezoelectric pellets 24 are electrically insulated from the rod 26.

In a variant embodiment (not shown), the prestress required for proper operation of the stacks of piezoelectric pellets 24 is exerted directly by the tube 14 because of the resilience of longitudinal fluting 14a formed therein. The rods 26 and the nuts 28 can then be replaced by any other means for maintaining the pellets 24, e.g. a coating of insulating glue applied to the inside and outside peripheral surfaces of the stack of pellets.

The drive members acting on each of the pairs of segments 20 alternate inside the tube 14 as can be seen, in particular, in FIG. 2. In other words, two consecutive drive members 22 act on two different pairs of different segments 20 along directions which are mutually orthogonal and perpendicular to the axis of the tube 14.

In addition, the drive members 22 are distributed inside the tube 14 in such a manner that there is the same spacing in the longitudinal direction between any two consecutive drive members.

It is advantageous to place the same number of drive members 22 between each pair of segments. Thus, and purely by way of example, each pair of segments may be associated with six drive members 22.

In order to enable the volume occupied inside the tube 14 by the piezoelectric ceramic pellets 24 to be relatively large compared with the total volume of the source, these pellets are advantageously square in outside section, as shown in FIG. 2. In addition, the gap between the pellets for two adjacent drive members should also be as small as possible. It is shown below that the ratio between the volume of piezoelectric ceramic and the total volume of the source may influence the performance thereof.

As shown in FIG. 3, the piezoelectric pellets 24 of each drive member 22 have connection tongues 24a on each of their faces for connecting the pellets to an electrical circuit (not shown).

When the acoustic transducer is a seismic source, this circuit is a power supply circuit operating at determined intervals to apply an excitation signal to the pellets 24 constituting each of the drive members 22. These pellets 24 are then preferably connected in parallel so as to obtain maximum deformation of the stacks of pellets for a given electrical voltage (maximum voltage about 3000V).

In contrast, when the acoustic transducer operates as a receiver, the pellets 24 are connected in series and are connected to a signal processing circuit.

When the transducer operates as a source, the drive members 22 are advantageously all excited in phase so that all four segments 20 of the source are displaced simultaneously and in the same direction (inwards or outwards). A uniform mass flow rate variation is then established around the vertical axis of the source.

In certain special cases, the drive members 22 associated with each of the two pairs of segments 20 may be excited in phase opposition so as to generate pressure variation around the source in azimuth mode m=2.

As shown very diagrammatically in FIG. 1, the transducer 12 of the invention advantageously includes compensation means 32. These compensation means 32 have the function of permanently balancing the hydrostatic pressure of a liquid or gaseous fluid filling the inside volume 34 of the tube 14 relative to the pressure that exists outside the tube 14 (with this pressure having a maximum value of about 1400 bars).

In the embodiment shown in FIG. 1, these compensation means 32 which are placed above the top plug 16 and comprise a cylindrical vessel defining an internal bore having a vertical axis in which a piston 40 is slidably received. Beneath the piston, the cylindrical vessel constitutes a variable volume chamber 36 which communicates with the inside volume 34 of the tube 14 via restriction-forming means constituted by a restriction 38 passing through the top plug 16 in the embodiment shown. In a variant, the restriction forming means could equally well be constituted by a pair of non-return valves mounted in opposite directions. A chamber 42 formed inside the cylindrical vessel above the piston 40 communicates with the outside via a passage 44.

In the above-described disposition, it will be understood that any change in the static pressure outside the acoustic transducer 12 is immediately conveyed to the inside of the chamber 42 via the passage 44. This change in pressure has the immediate effect of displacing the piston 40 up or down, depending on whether the external pressure decreases or increases. Balance between the pressure of the fluid contained in the chamber 36 and the outside pressure is thus immediately re-established. Consequently, the static pressure in the inside volume 34 automatically becomes equal to the static pressure outside the source. However, the restriction 38 has the effect of preventing dynamic pressure variations resulting from excitation of the drive members 22 being attenuated by the compensation means 32.

In a variant, it should be observed that the piston 44 could be replaced by a deformable membrane. The presence of compensation means 32 serves to avoid any risk of the ceramic pellets 24 depolarizing under the effect of the uniaxial stress applied thereto by the outside pressure. In addition, it makes it possible to maintain fluid-tightness between the transducer and the outside medium without difficulty even at high pressures.

When the fluid contained in the inside volume 34 of the tube 14 is a liquid, the efficiency of the source is at an optimum when the volume of the ceramic is equal to about 0.6 times the total inside volume of the tube 14. Nevertheless, efficiency remains at a good level so long as this ratio lies in the range 0.3 to 0.7. When the fluid is a gas, the optimum operating range of the source is much larger, extending over a ceramic volume of between about 0.2 times to about 0.8 times the volume of the source.

In the above-acoustic transducer 12, the outer tube 14 serves to provide a fluid-tight separation between the inside fluid and the external fluid. It also serves to provide acoustic sealing while mechanically decoupling the four sectors 20, by virtue of four longitudinal flutes 14a formed inside the tube between adjacent sectors 20 and extending over the entire length of the tube between the plugs 16. These longitudinal flutes 14a provide a convex face directed towards the inside of the tube in each of the zones situated between two consecutive segments 20.

While the flutes 14a constitute no obstacle to radial displacement of the sectors 20 under the effect of drive from the drive members 22, because of the shape given to them inside the tube 14, they contribute to locally amplifying the change in volume when the drive means are actuated and consequently to further improving the acoustic performance of the transducer.

The flutes 14a may be formed in the tube 14 by using the hydraulic forming technique, for example.

By virtue of the various characteristics described above, the acoustic transducer of the invention makes it possible to obtain particularly high levels of acoustic performance, corresponding to a change in volume of about 1 cm$^3$ for a transducer having a diameter of about 10 cm and a longitudinal dimension of about 50 cm. It is to be pointed out that with such a small dimension in the longitudinal direction, the resonance frequency of the transducer lies above the frequency range of interest (typically 200 Hz to 2 kHz) for performing cross-well measurements or single-well measurements, or for performing measurements between a shallow well and the surface of the ground. This simplifies the processing of the signals detected by the receivers.

In addition, the acoustic transducer of the invention is suitable for withstanding pressures much greater than 400 bars, and for withstanding temperatures of as much as 175° C.

Naturally, the invention is not limited to the embodiment described above by way of example, but covers any variant thereof.

Thus, the drive members may be constituted by any system capable of generating a force, such as piezoelectric systems, magnetostrictive systems, hydraulic systems, mechanical systems, or other systems. When such systems are reversible, as applies in particular to piezoelectric systems and to magnetostrictive systems, the acoustic transducer operates equally well as a source and as a receiver. When the systems are not reversible, then the acoustic transducer can only operate as a source.

In addition, the number of drive members associated with each pair of segments may vary depending on the length given to the transducer. Similarly, although the embodiment described having only two pairs of longitudinal segments corresponds to the best configuration for a short transducer, additional pairs of segments and associated drive members may be provided in a transducer of greater length. Furthermore, the drive members may have an outside shape different from the square shape described, for example they may be rectangular, thereby enabling the volume of the drive members to be increased relative to the total volume of the transducer. Finally, it will readily be understood that the compensation means described in outline above may be replaced by any technically equivalent means known to the person skilled in the art.

I claim:

1. An acoustic transducer, comprising:

a deformable tube closed at one end, at least a first pair and a second pair of diametrically opposite elongate segments in angularly alternating arrangement disposed on the inside wall of said tube;

said tube and said pairs of segments defining an inside space comprising at least one first and at least one second longitudinal sections in a non-overlapping, longitudinally alternating arrangement;

first drive means and second drive means extending within said longitudinally alternating spaces between the two segments of, respectively, said first pair and said second pair in the respective diametric direction thereof and operable to expand along said diameter for action upon the respective pair of segments;

said first drive means being located in said at least one first longitudinal section while said second drive means are located in said at least one second longitudinal section.

2. An acoustic transducer according to claim 1, wherein said first and second drive means occupy a volume in the range of 0.3 to 0.7 times the total inside volume of the tube.

3. An acoustic transducer according to claim 1, wherein the deformable tube defines an internal volume filled with fluid and communicating with compensation means, whereby the pressure of said fluid is substantially equal to the static pressure outside the tube.

4. An acoustic transducer according to claim 3, wherein the compensation means include restriction-forming means, whereby the inside volume of the deformable tube communicates with a variable volume chamber delimited by piston-forming means subjected to the outside static pressure on an opposite face.

5. An acoustic transducer according to claim 1, wherein each portion of the deformable tube situated between two adjacent segments includes a flute having a convex face directed towards the inside of the tube.

6. An acoustic transducer according to claim 5, wherein the deformable tube is closed at both ends by a rigid plug to which the ends of the segments are fixed, and the flutes of the deformable tube extend to the rigid plug.

7. An acoustic transducer according to claim 1, wherein the segments present a common cylindrical outside envelope, with the two segments of each pair having plane and parallel inside faces which are engaged by said drive means.

8. An acoustic transducer according to claim 1, comprising two pairs of opposite segments, with said drive means extending along two mutually perpendicular directions that are perpendicular to the axis of the tube.

9. An acoustic transducer, comprising:

a deformable tube closed at one end, a first pair and a second pair of diametrically opposing elongate segments in angularly alternating arrangement disposed on the inside wall of said tube;

said tube and said pairs of segments defining an inside space comprising at least one first and at least one second longitudinal sections in a non-overlapping, longitudinally alternating arrangement;

at least one first and one second stack of piezoelectric pellets uninterruptedly extending within said space between the two segments of, respectively, said first pair and said second pair in the respective diametric direction thereof and operable to expand along said diameter for action upon the respective pair of segments;

said at least one first stack being located in said at least one first longitudinal section while said at least one second stack is located in said at least one second longitudinal section.

10. An acoustic transducer according to claim 9, wherein said first and said second stacks are placed on prestressed rods interconnecting the segments of the respective pair.

11. An acoustic transducer according to claim 9, wherein the piezoelectric pellets of said stacks are all identical and are square in outside section.

12. An acoustic transducer according to claim 10, wherein the piezoelectric pellets of said stacks are all identical and are square in outside section.

13. An acoustic transducer, comprising:

a deformable tube closed at one end, at least a first pair and a second pair of diametrically opposite elongate segments in angularly alternating arrangement disposed on the inside wall of said tube;

said tube and said pairs of segments defining an inside space comprising at least one first and at least one second longitudinal sections in a non-overlapping, longitudinally alternating arrangement;

drive means extending within said longitudinally alternating spaces between the two segments of, respectively, said first pair and said second pair in the respective diametric direction thereof and operable to expand along said diameter for action upon the respective pair of segments;

the drive means located in said at least one first longitudinal section being disposed in one diametric direction, and the drive means located in said at least one second longitudinal section being disposed in the other diametric direction.

* * * * *